UNITED STATES PATENT OFFICE.

JOHN R. WEED, OF NEW YORK, N. Y.

IMPROVEMENT IN ARTICLES OF FOOD.

Specification forming part of Letters Patent No. 130,091, dated July 30, 1872.

*To all whom it may concern:*

Be it known that I, JOHN R. WEED, of the city, county, and State of New York, have invented a new and useful Improvement in Nutritious Compound; and I do hereby declare the following to be a full, clear, and exact description thereof, which will enable those skilled in the art to make and use the same.

This invention relates to a compound of flesh and vegetables, prepared by first evaporating therefrom the moisture according to a process described in the patent of Charles Alden, dated March 15, 1870, and reissued October 17, 1871, No. 4,592, said ingredients being mixed together in suitable proportion, as hereinafter described, with or without herbs, spices, or other condiments, in such a manner that a mixture is produced which will keep for a long time, and which can be prepared for food, either in form of soups, stews, or salads, in a short time and with very little labor.

In carrying out my invention I take beef or other meat or fish and expose the same to an evaporating process, by preference such as described in the patent of Charles Alden above named, or in a patent granted to H. Endemann October 24, 1871, No. 120,253; and I also take potatoes, carrots, onions, tomatoes, parsley, celery, okra, string-beans, peas, or other vegetables, and subject them to the same evaporating process, and, after having reduced the several ingredients to a powder or granulated state, I mix them together in about the following proportion: Meat, (beef or other,) five ounces; potatoes, two ounces; carrots, one ounce; onions, one ounce; tomatoes, one ounce; parsley, one-eighth of an ounce; celery, one-eighth of an ounce; okra, one-half of an ounce; string-beans, one-half of an ounce. After having the ingredients thoroughly mixed I put up my compound, either compressed or otherwise, in packages of suitable size for the market. These packages are, by preference, enveloped in paper, skins, or foil, so as to protect the contents thereof against the atmosphere and against moisture.

In preparing my compound any other kind of meat or fish may be substituted for beef, and the vegetables to be mixed with the flesh and potatoes may be changed to suit taste and convenience.

It is obvious that herbs, spices, or other condiments may be added, if desired.

A compound of evaporated fish and evaporated potatoes, for instance, may be prepared according to my invention, and from this compound fish-balls or other articles of food may be produced in a short time and with little labor.

A compound of beef or fowl with potatoes and some vegetables may be used with advantage for soups, stews, or hash, or for any other desirable preparation.

By evaporating the moisture from the meat and vegetables in the manner described before mixing these ingredients together a compound or compounds can be produced which will keep for a long time, and which contain a large percentage of nutritious matter in a comparatively small bulk. My compound or compounds are therefore of very great advantage for soldiers, seamen, or other parties which have to provide for food and keep the same on hand for some time ahead.

In order to further illustrate my invention I annex herewith some prescriptions:

Vegetable soup.—Lamb or mutton, four ounces; potatoes, two ounces; carrots, one ounce; cabbage, one-half of an ounce; onions, one-half of an ounce; tomatoes, one ounce; turnips, two ounces; condiments. Pea-soup.—Pork, beef, or mutton, six ounces; onions, one ounce; green or pipe peas, three ounces; celery, one-eighth of an ounce. Fish-balls.—Fish, five ounces; potatoes, five ounces; cream, one ounce; condiments. Hash.—Beef, mutton, veal, &c., ten ounces; potatoes, six ounces; onions, one-half of an ounce; condiments.

What I claim as new, and desire to secure by Letters Patent, is—

1. A compound made of evaporated meat or fish and evaporated vegetables mixed together, substantially in the manner and about in the proportion herein set forth.

2. A compound made of evaporated meat or fish and evaporated potatoes mixed together, substantially in the manner and about in the proportion herein described.

JOHN R. WEED.

Witnesses:
W. HAUFF,
E. F. KASTENHUBER.